US005765286A

United States Patent [19]

Sato et al.

[11] Patent Number: 5,765,286

[45] Date of Patent: Jun. 16, 1998

[54] RECONDITIONING METHOD FOR DEVELOPING ROLLER

[75] Inventors: Minoru Sato, Yokohama; Satoshi Kurihara, Tokyo; Katsunori Yokoyama, Yokohama; Akira Suzuki, Kawasaki, all of Japan

[73] Assignee: Canon Kabushiki Kaisha, Tokyo, Japan

[21] Appl. No.: 571,463

[22] Filed: Dec. 13, 1995

[30] Foreign Application Priority Data

Dec. 16, 1994 [JP] Japan .................................... 6-313279

[51] Int. Cl.$^6$ .................................................... B23D 15/00

[52] U.S. Cl. ...................... 29/895.1; 29/895.22; 29/895.3

[58] Field of Search ............................... 29/895.1, 895.3, 29/895.22, 402.03, 402.08

[56] References Cited

U.S. PATENT DOCUMENTS 4,700,450 10/1987 Michel .................................. 29/895.1
5,321,889 6/1994 Watanabe ............................... 29/895.3
5,367,769 11/1994 Searcy et al. .......................... 29/895.3
5,400,630 3/1995 Okumura et al. ....................... 29/895.1
5,630,196 5/1997 Swain .................................. 29/895.22

*Primary Examiner*—Irene Cuda
*Attorney, Agent, or Firm*—Fitzpatrick, Cella, Harper and Scinto

[57] ABSTRACT

A method for reconditioning a development roller includes a roller portion for conveying developer, and a plastic flange portion connected to one end of the roller portion to transmit a driving force; wherein after the flange portion and roller portion are separated, a part of the roller portion, which is deformed is removed, and a flange portion, which is longer in the axial direction of the roller portion than the separated flange portion, is joined with said separated and shortened roller portion.

12 Claims, 12 Drawing Sheets

RECONDITIONING METHOD FOR DEVELOPING ROLLER

FIELD OF THE INVENTION AND RELATED ART

The present invention relates to a method for recovering, remanufacturing or reconditioning a development roller employed in a development apparatus of an image forming apparatus such as a copying machine or a printer.

It is known that the photosensitive drum, and processing means such as a cleaning unit or a development unit, of an image forming apparatus such as a laser beam printer, are integrally assembled into a cartridge to form a process cartridge, which can be removably mounted to render an image forming apparatus free of maintenance.

Conventionally, when the toner within a development unit of a process cartridge was depleted, the process cartridge was exchanged with a new one.

Formerly, all of the components in a new process cartridge were new, but in recent years, some of those components have come to be recycled by reconditioning to save natural resources.

When the service life of a process cartridge expired, the process cartridge was disassembled to separate the components. Among the separated components, the developer carrier member was simply cleaned of the contamination (toner, dust) adhering to the surface, by an air blower or the like, and was visually inspected for its surface condition or the like. Then, those which passed the visual inspection were reassembled into a process cartridge, and those which did not pass the visual inspection, were recycled as the raw material for forming the developer carrier member.

However, the ratio at which the used developer carrier passed the visual inspection was rather low; therefore, it could not be said that resource was sufficiently preserved.

In addition, in the case of a process cartridge comprising a used developer carrier member, which passed the inspection, image density deterioration was liable to occur.

SUMMARY OF THE INVENTION

The present invention has been made to solve the problems described above, and its primary object is to provide a method for reconditioning a development roller comprising a roller portion for conveying developer, and a plastic flange portion connected to one end of the roller portion to transmit a driving force; wherein after the flange portion and roller portion are separated, the area of the roller portion, which was deformed as the flange portion was joined with the roller portion, is removed, and a new flange portion, which is longer in the axial direction of the roller portion than the flange roller portion, is joined with the separated and shortened roller portion, on the shortened side.

According to the present invention, a used development roller can be reused to obtain a performance equal to that of a new development roller.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENT

Embodiment 1

Hereinafter, the preferable embodiments of the present invention will be described with reference to the drawings.

(General Structures of Process Cartridge and Image forming Apparatus)

Before describing the present invention in detail, the general structure of a process cartridge integrally comprising a photosensitive drum and a cleaning blade, and also the general structure of a laser beam printer (image forming apparatus), in which the process cartridge is mounted, will be described.

Figure 1:
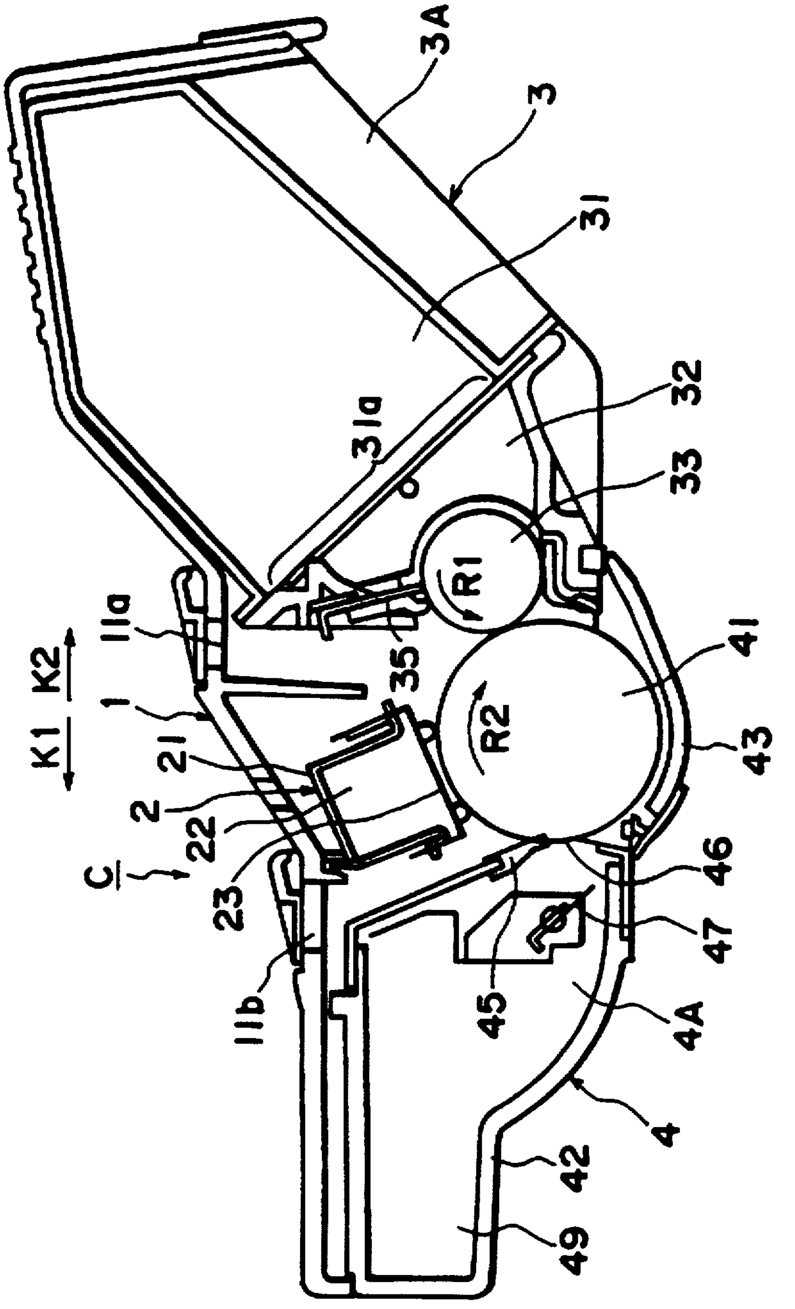
FIG. 1 is a sectional view of the process cartridge in the first embodiment of the present invention.

FIG. 1 is a schematic section of a process cartridge C. The process cartridge C can be disassembled into four major units: a top frame 1 (cartridge cover), a primary charger unit 2 (charging means), a development unit 3 (developing means), and a cleaning unit 4 (cleaning means). The development unit 3 and cleaning unit 4 comprise a toner/ development frame 3A (T-D frame) and a drum frame unit 4A, respectively. These frames store or support various components, which will be described later. After the process cartridge C is disassembled into four units, the photosensitive drum 41 (electrophotographic photosensitive drum) is in the cleaning unit 4.

The top frame 1 is constituted of a frame which covers, from above, the primary charger unit 2, the development unit 3, and the cleaning unit 4. It is provided with substantially vertical through holes 11*a* and 11*b*, which are located substantially at the middle portion, relative to the front to back direction (directions indicated by arrow marks K1 and K2), allowing exposure light and pre-exposure light to reach the surface of the photosensitive drum 41.

The primary charger unit 2 comprises a shield 21, a discharge wire 22, and a grid 23. The shield 21 has a U-shaped sectional profile, and its opening side faces the photosensitive drum 41. The discharge wire 22 is disposed within the space surrounded by the shield 21. The grid 23 is disposed at the opening of the shield 21.

Figure 8:
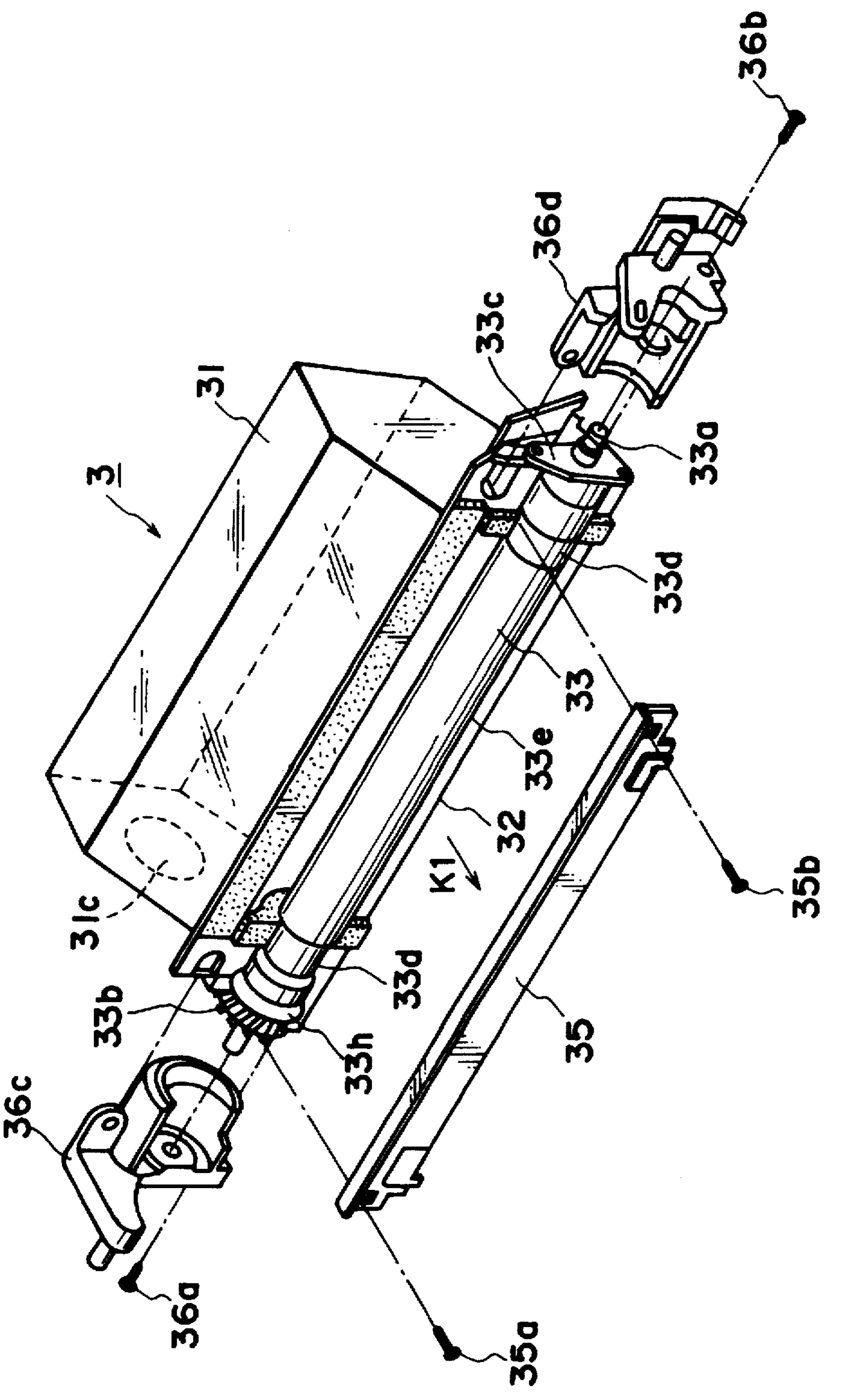
FIG. 8 is a perspective view of a partially disassembled development unit.
Figure 9:
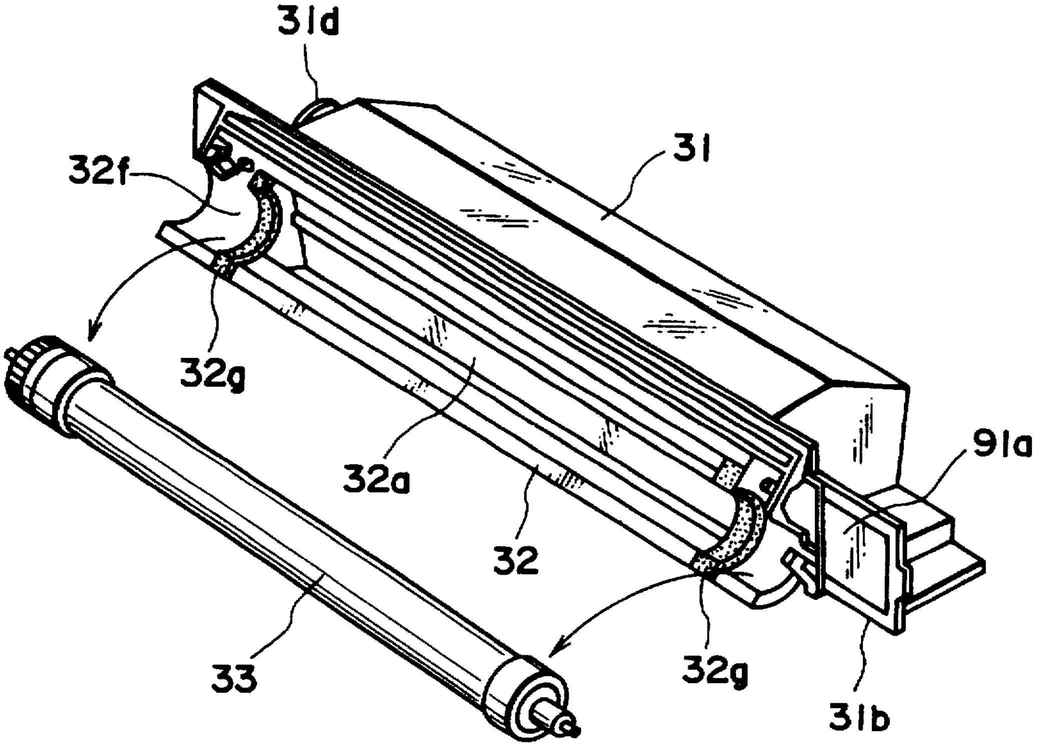
FIG. 9 is a perspective view of the further disassembled development unit.

The development unit 3 comprises a toner frame 31, a development frame 32, which is disposed immediately adjacent to the toner frame 31, and a development roller 33. The toner frame 31 constitutes a toner (developer) storage portion, and has an opening 31*a*. The development frame 32 constitutes a development chamber, and an opening 32*a*. The development chamber is connected to the toner storage portion through the openings 31*a* and 32*a*. The development roller 33 is supported on the development frame 32, so that it is disposed immediately adjacent with, and in parallel to, the photosensitive drum 41. It is rotatable in the direction of an arrow mark R1. Above the development roller 33, a development blade 35 is disposed to regulate the thickness of the toner layer coated on the surface of the development roller 33. Referring to FIGS. 8 and 9, a reference 32*f* designates a mount, on which the development roller 33 is mounted using a left arm 36*c* and a right arm 36*d*. References 32*g* and 33*b* designate an end seal and a gear, respectively.

The development roller comprises a metallic core of aluminum, SUS or the like, and a surface layer of resin containing electrically conductive material such as carbon (hereinafter, carbon coat).

The amount of the triboelectrical charge is controlled by the above arrangement.

The cleaning unit 4 comprises the photosensitive drum 41 and a cleaning apparatus 42. The photosensitive drum 41 is rotatively supported so that it can rotate in the direction of an arrow mark R2. Below the photosensitive drum 41, a protective plate 43 (drum shutter) is disposed to prevent the photosensitive drum 41 from being unnecessarily exposed, or being physically damaged. This protective plate 43 is retractable, and as the process cartridge C is inserted into the main assembly of an image forming apparatus, which will be described later, it is automatically retracted to expose the bottom portion of the photosensitive drum 41. The cleaning apparatus 42 comprises: an elastic cleaning blade (composed of urethane rubber, for example), which is disposed in contact with the surface of the photosensitive drum 41 so that the residual toner adhering to the surface of the photosensitive drum 41 is removed as the elastic cleaning blade slides on the surface of the photosensitive drum 41; a receptor sheet 46 for catching the residual toner being scraped down by the cleaning blade 45; a waste toner conveyer member 47 for conveying the residual toner caught by the receptor sheet 46 (in the direction of an arrow mark K1); and a waste toner dump 49 for collecting the conveyed residual toner.

Figure 2:
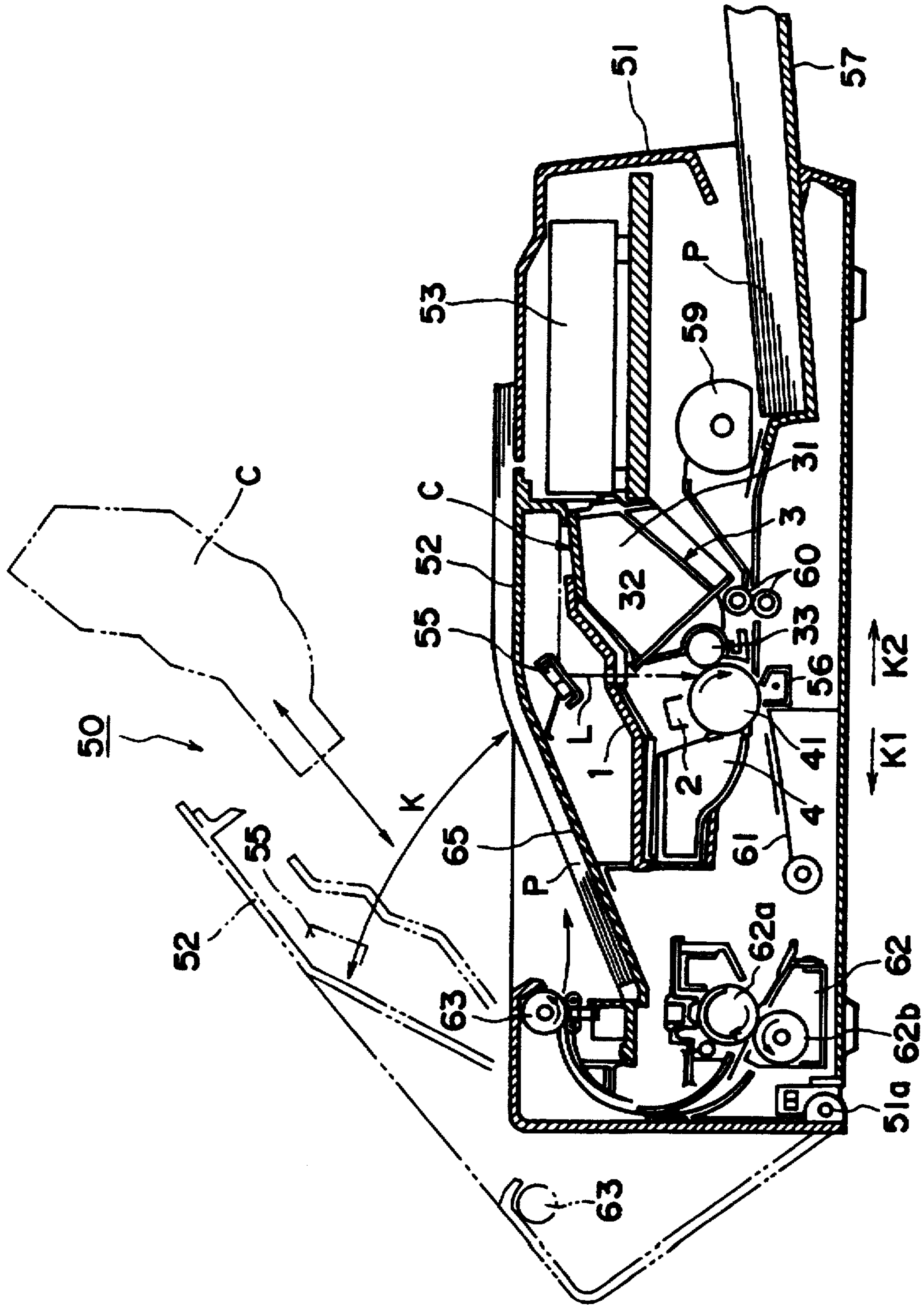
FIG. 2 is a sectional view of the image forming apparatus in the first embodiment of the present invention.

The process cartridge C constituted as described above is mounted in a laser beam printer 50 illustrated in FIG. 2. The laser beam printer 50 is constituted of an apparatus main assembly 51, and a cover 52, which is rotatable about a rotational axis 51*a* located at the bottom front side (indicated by the arrow mark K) of the apparatus main assembly 51. Normally, this cover 52 is closed (as illustrated by the solid line in FIG. 2), but is opened (as illustrated by the double dot chain line in FIG. 2) when the process cartridge C is exchanged, or when a jam caused by a transfer material P such as paper, on which images are formed, must be dealt with. When the process cartridge C is installed in the apparatus main assembly 51, it is temporarily held by the opened cover 52, and as the cover 52 is closed, the process cartridge C is moved to a predetermined location (illustrated by the solid line in FIG. 2) within the apparatus main assembly 51. As the process cartridge C is moved to the predetermined location, the photosensitive drum 41, the development roller 33, and the like, are connected to the corresponding driving means (unillustrated) of the apparatus main assembly, and are rotatively driven in the directions indicated by arrow marks R2 and R1, respectively. At the same time, the discharge wire 22 and development roller 33 of the primary charger unit 2 are connected to the high voltage power source of the apparatus main assembly 51.

Next, referring to FIGS. 1 and 2, the image formation process of the laser beam printer 50 will be described. As an image formation start command is sent in through a start button (unillustrated), the photosensitive drum 41 is rotatively driven in the arrow R2 direction, and the surface of the photosensitive drum 41 is uniformly charged by the primary charger unit 2. The charged surface of the photosensitive drum 41 is exposed to an exposure light L from an exposure means comprising a laser unit 53, a reflection mirror 55, and the like, whereby an electrostatic latent image reflecting image data is formed on the surface of the photosensitive drum 41. The electrostatic latent image becomes a toner image as the toner from the development unit 3 is adhered to the electrostatic latent image by the development roller 33. The toner image formed on the photosensitive drum 41 is transferred onto the transfer material P by a transfer apparatus 56. The transfer material P is stored in a sheet feeder cassette 57 mounted in the rear side (indicated by the arrow mark K2) of the apparatus main assembly 51. It is fed out from the cassette 75 by a sheet feeder roller 59, and is delivered to the transfer apparatus 56 by a registration roller pair 60, in synchronism with the rotation of the photosensitive drum 41. The transfer material P, onto which the toner image has been transferred, is conveyed along a conveyance guide 61 to be delivered to a fixing apparatus 62. Here in the fixing apparatus 62, the transfer material P with the toner image is heated and compressed by a fixer roller 62*a* and a pressure roller 62*b*, respectively, whereby the toner image is permanently adhered (fixed) to the surface of the transfer material P. The transfer material P, to which the toner image has been fixed, is discharged by a sheet discharge roller 63, into a sheet discharge tray constituted of the top surface of the cover 52.

(Disassembly Steps for Process Cartridge)

Next, a case, in which a used process cartridge C is reconditioned to be used again, will be described. Usually, the used process cartridges are recovered from the market through the cooperation from consumers. After recovery, some of the components in the used process cartridge C must be replaced; for example, the photosensitive drum, the photosensitive surface layer of which has deteriorated through usage, and other members, the service lives of which have expired, or which have been somehow damaged.

When the process cartridge C in this embodiment is disassembled to replenish it with the toner, or to exchange the aforementioned components, it is first disassembled into four major units, and then, each unit is further disassembled as needed.

(Disassembly Sequence)

First, a step in which the process cartridge C is disassembled into the aforementioned four major units, that is, the top frame 1, the primary charger unit 2, the development unit 3, and the cleaning unit 4, will be described.

In this first step, the process cartridge C to be disassembled is placed in an air duct (unillustrated) to be blown with air so that the toner or dust adhering to the surface is removed.

Figure 3:
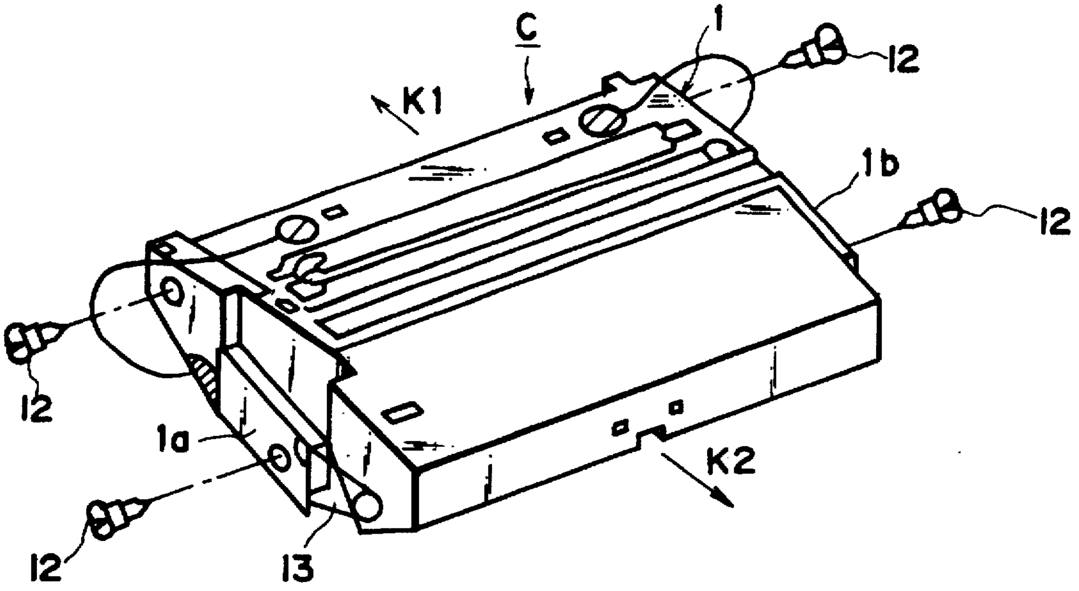
FIG. 3 is a perspective view of the partially disassembled process cartridge in the first embodiment of the present invention.

Next, referring to FIG. 3, two left pins 12 and two right pins 12, that is, a total of four pins, with which the left and right wall portions 1*a* and 1*b* of the top frame 1 (front of the apparatus is indicated by the arrow mark K1) are fixed to the cleaning unit 4, are removed. The head of the pin 12 is formed like a flange, and has a recess at the center. The provision of the flange-like head makes it easier to firmly clasp the pin 12, with a radio pliers or the like, so that the pin 12 can be removed by pulling and twisting. The pin 12 is made of resin, and its end portion opposite to the head portion constitutes an engagement portion. This engagement portion, and the flange-like portion, which is clasped with a radio pliers, are liable to be damaged; therefore, the used pins 12 are replaced with new ones during the re-assembly of the process cartridge C.

The toner frame 31 and development frame 32 are sealed with a seal film (unillustrated), which is protected by a seal film cover 13. This seal film cover 13 must be pulled out with a radio pliers or the like before a new process cartridge C is put to use for the first time. It is fixed like the pin 12; therefore, it must be also replaced with a new pin during the reassembly of the process cartridge.

Figure 4:
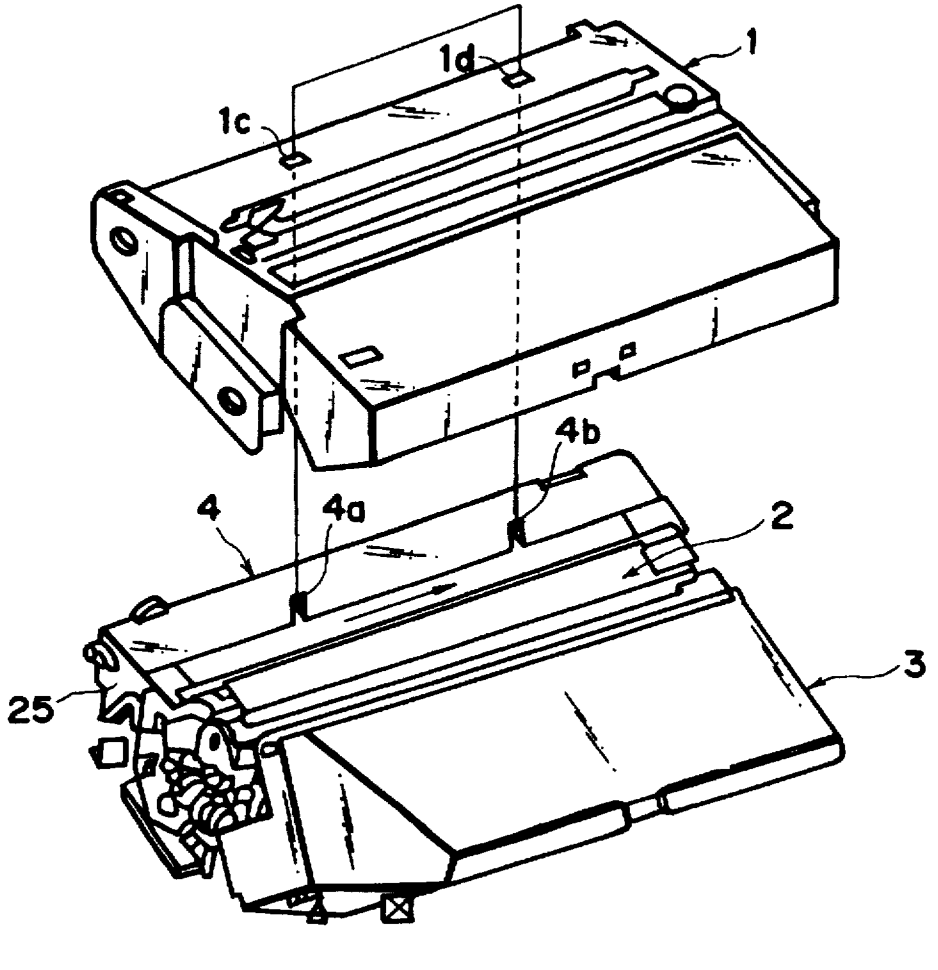
FIG. 4 is a perspective view of the further disassembled process cartridge in the first embodiment of the present invention.

Next, the top frame 1 is removed by grasping the lateral ends of the top frame 1, with both hands, as illustrated by the double dot chain line in FIG. 3; the top frame can be lifted by pulling it upward while pressing the right and left hatched portions located on the top surface, with the right and left thumbs, respectively, and at the same time, pulling outward, with the fingers, the hatched portions (only one of them is illustrated) located at the bottom portions of the right and left wall portions 1*a* and 1*b*, respectively, of the top frame 1. With the above action, the engagement between claws 4*a* and 4*b*, which project from the top surface of the cleaning unit 4, and the engagement holes 1*c* and 1*d* of the top frame 1, is broken to allow the top frame 1 to be disengaged from the cleaning unit 4 as shown in FIG. 4, ending the step for removing the top frame 1, which is one of the four major units. The removed top frame 1 is blown with air in the air duct to remove the toner or foreign matter adhering to the surface or interior, and then, the cleaned top frame 1 is reused as is.

Figure 5:
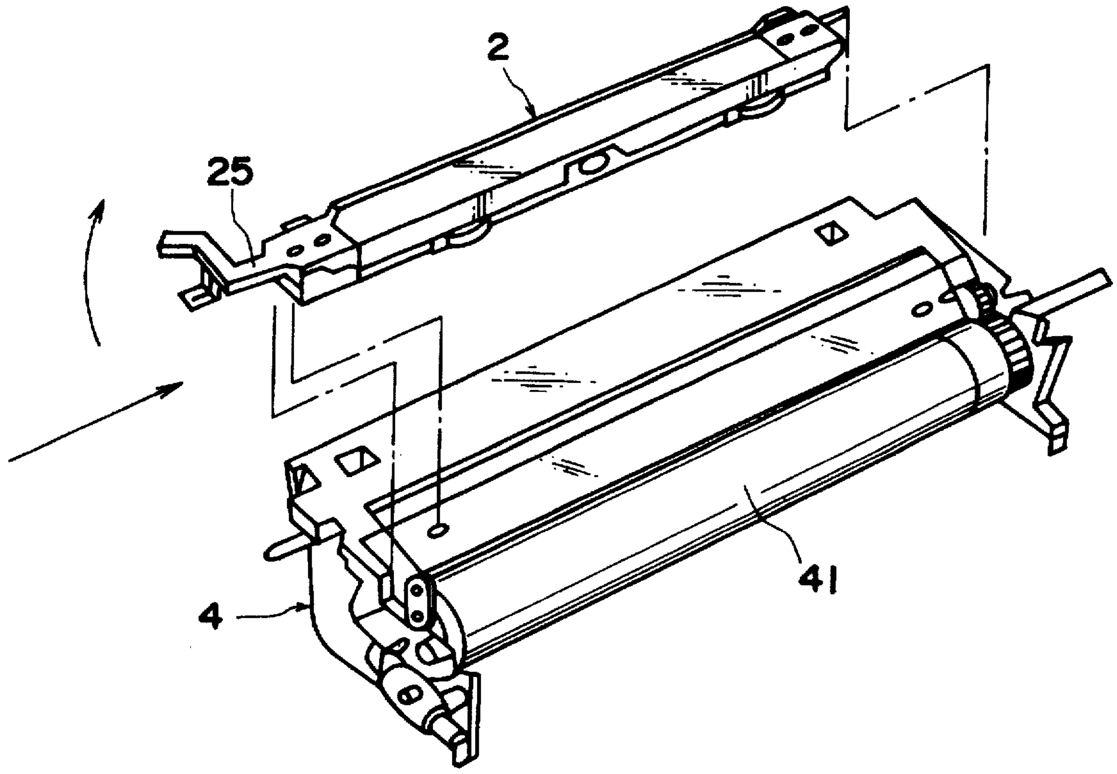
FIG. 5 is a perspective view of the further disassembled process cartridge in the first embodiment of the present invention.
Figure 6:
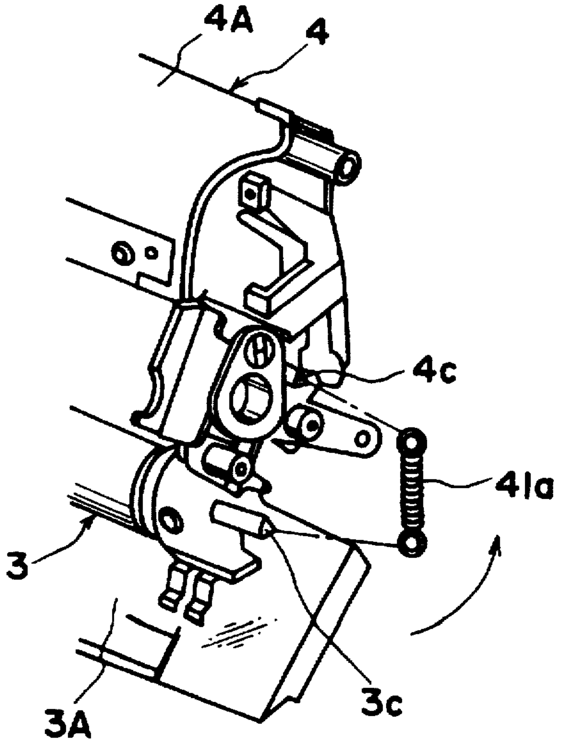
FIG. 6 is a perspective view of the further disassembled process cartridge in the first embodiment of the present invention.
Figure 7:
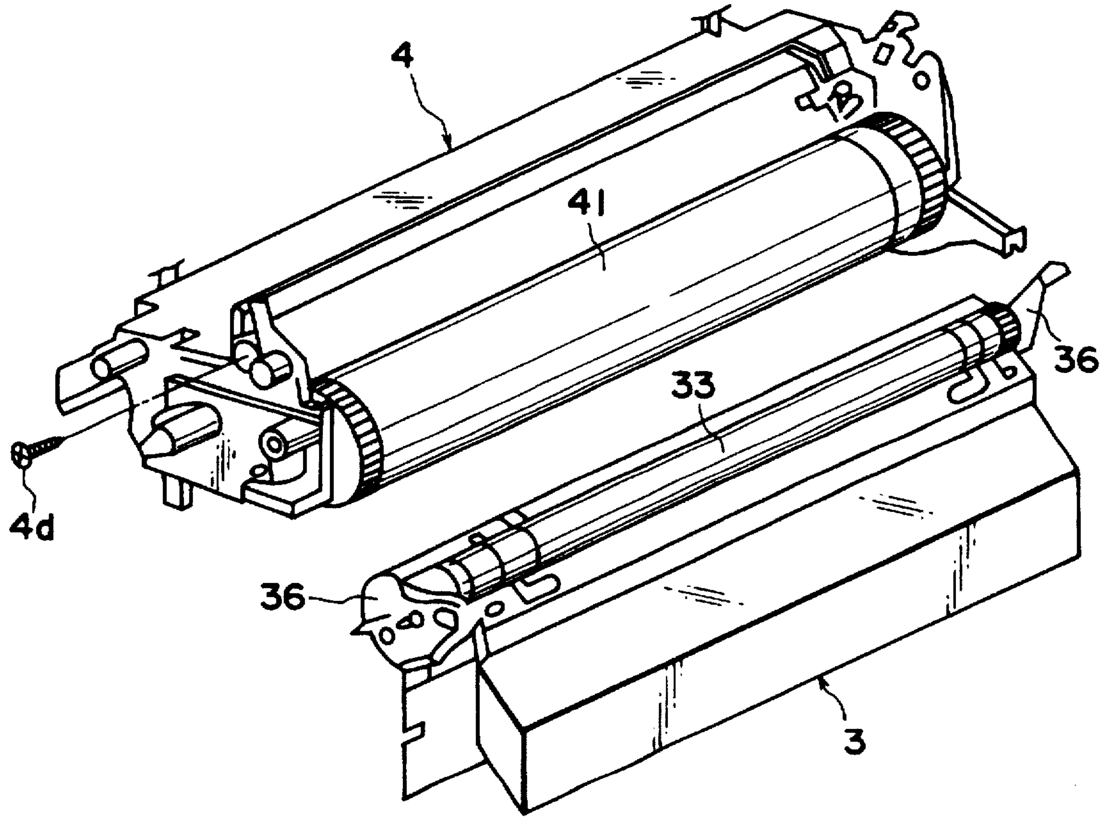
FIG. 7 is a perspective view of the further disassembled process cartridge in the first embodiment of the present invention.

The next step is for removing the primary charger unit 2 fitted in the top portion of the cleaning unit 4. Referring to FIGS. 4, 5 and 6, the primary charter unit 2, one end of which constitutes a leg portion 25, is mounted on the cleaning unit 4, being pressed toward the leg portion 25 by a pressing member (unillustrated), which is a part of the cleaning unit 4 and is located on the side opposite to the leg portion 25. Thus, the primary charger unit 2 is completely separated from the cleaning unit 4 as it is lifted by grasping by hand and gently pressing the leg portion 25 in the horizontal direction (indicated by the arrow mark).

Before the development unit 3 and cleaning unit 4 are separated, a compression spring 41*a* (spring member) must be removed, one end of which is anchored to the projection 3*c* of development frame 3A, and the other end of which is anchored to the projection 4*c* of the drum frame 4A, being thereby disposed between the two frames, as shown in FIG. 6. There is another compression spring 41*a*, the specifications of which are substantially the same as those of the preceding compression spring 41*a*. It is disposed on the other side of the development unit 3 and cleaning unit 4. This spring 41*a* must also be removed. These compression springs press the development roller 33 mounted in the development unit toward the photosensitive drum 41 mounted in the cleaning unit 4, so that a spacer (unillustrated), which is fitted on the development roller 33, at each end, on the peripheral surface, remains in contact with the corresponding end portion of the photosensitive drum 41, where no image is formed, to maintain a predetermined distance between the surfaces of the photosensitive drum 41 and development roller 33. These compression springs 41*a* are inspected by an inspector, and those meeting a predetermined standard are reused for the reassembly of the process cartridge C.

Immediately after the removal of the compression spring 41*a*, the development unit 3 and cleaning unit 4 are still connected to each other by a pin 4*d*, about which both units are rotatable relative to each other. In order to separate the development unit 3 and cleaning unit 4, the pin 4*d* must be pulled out with a radio pliers, and thereafter, the development unit 3 is rotated approximately 80° in the direction of an arrow in FIG. 6. Next, as the development unit 3 is slightly lifted by the right-hand side end, their engagement on the right-hand side is broken to allow the development unit 3 and cleaning unit 4 to be separated.

Consequently, the process cartridge C is disassembled into the four major units: the top frame 1, the primary charger unit 2, the development unit 3, and the cleaning unit 4.

(Disassembly Sequence for Development Unit)

Figure 10:
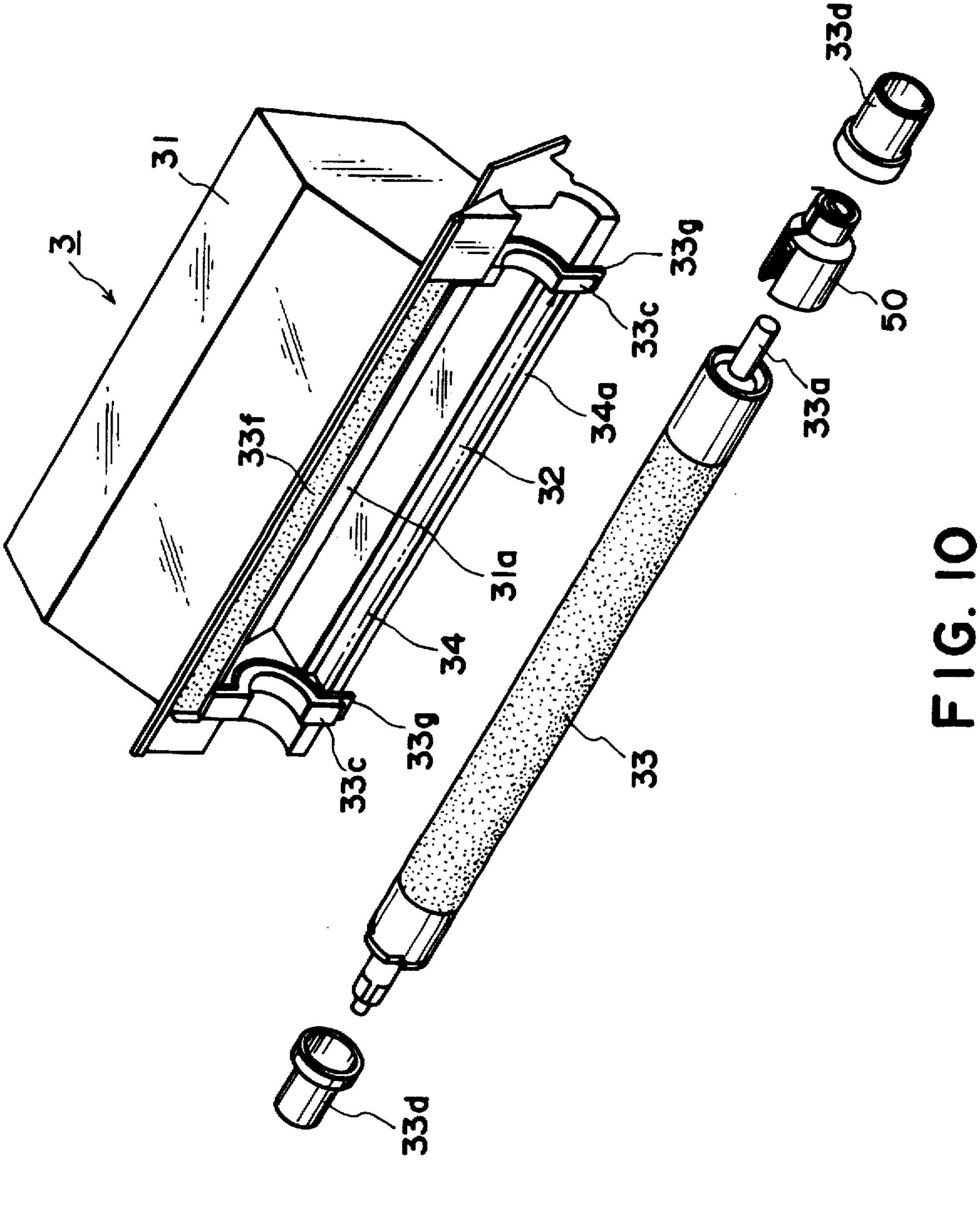
FIG. 10 is a perspective view depicting a development unit and a partially disassembled development roller.

Next, a method for disassembling the development unit 3 will be described. The development unit 3 separated from the cleaning unit 4 is further disassembled into smaller sections. Referring to FIGS. 8, 9 and 10, screws 35*a* and 35*b* are removed first, and then, the development blade 35 is removed. Next, the screws 36*a* and 36*b* on the left and right ends are removed, and the left and right arms 36*c* and 36*d* are pulled out, respectively. Then, a gear 33*b* is removed leftward, and bearings 33*c* and 33*h* are removed rightward and leftward, respectively. Thereafter, the development roller 33 containing a magnet 33*a* is removed frontward (direction of an arrow mark K1). The removed development roller 33 is cleaned using compressed air, and then is disassembled into the magnet 33*a*, a development roller main assembly 33*e*, rollers 33*d*, and a flange 50 with a rotary electrode, by pulling them apart.

(Disassembly Sequence for Development Roller)

The development roller 33 is further disassembled into a plastic flange 51 and a metallic roller 52 to recondition the metallic roller 52. This is because the flange 51 must be replaced in any case, since the surface of the flange is shaved away through usage, and if the shaved flange 51 is not replaced or reconditioned, image deterioration such as pitch aberration is liable to occur, and also, since the ambient temperature during the baking process, in which a carbon coat is placed on the metallic roller 52 to recondition it, exceeds the thermal deformation point of the plastic used for the flange 51, deforming the flange 51. Thus, the development roller 33 is separated into the plastic flange 51 and metallic roller 52.

Figure 11:
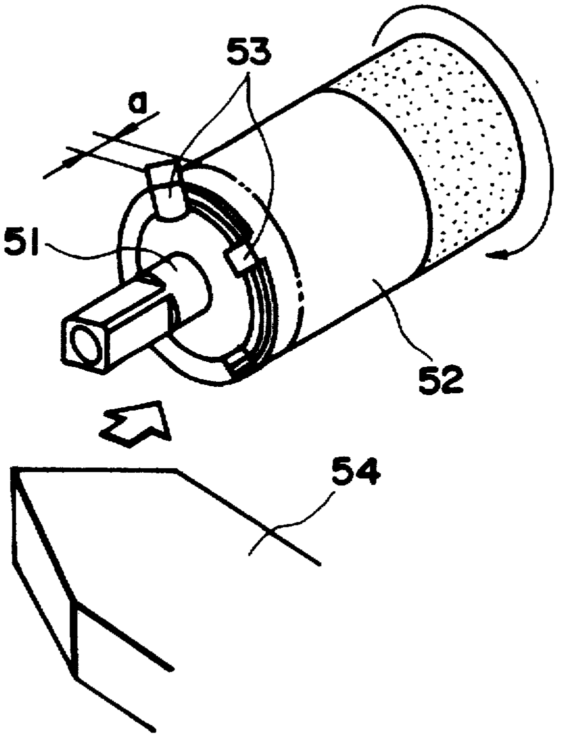
FIG. 11 is a perspective view of the partially disassembled development roller.
Figure 12:
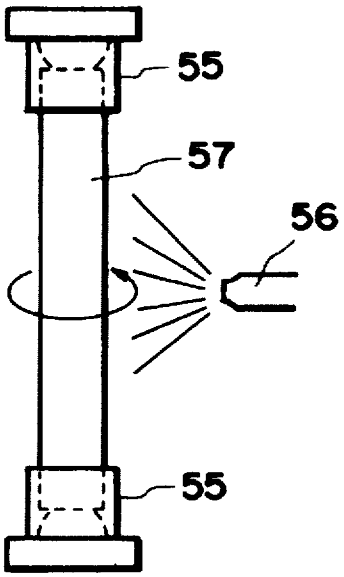
FIG. 12 is an explanatory drawing depicting how a metallic roller is blasted for reconditioning.
Figure 13:
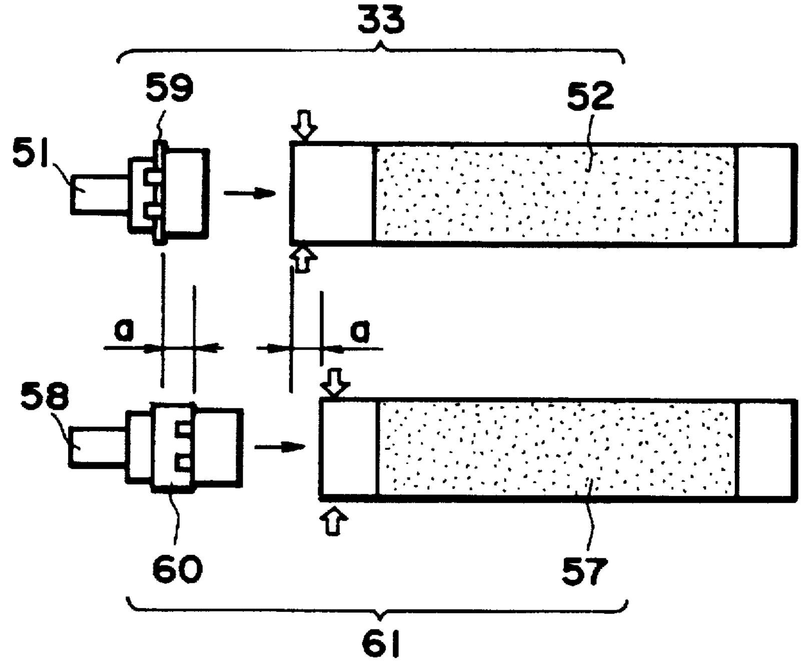
FIG. 13 is an explanatory drawing depicting a method for reconstructing the development roller according to the present invention.
Figure 14:
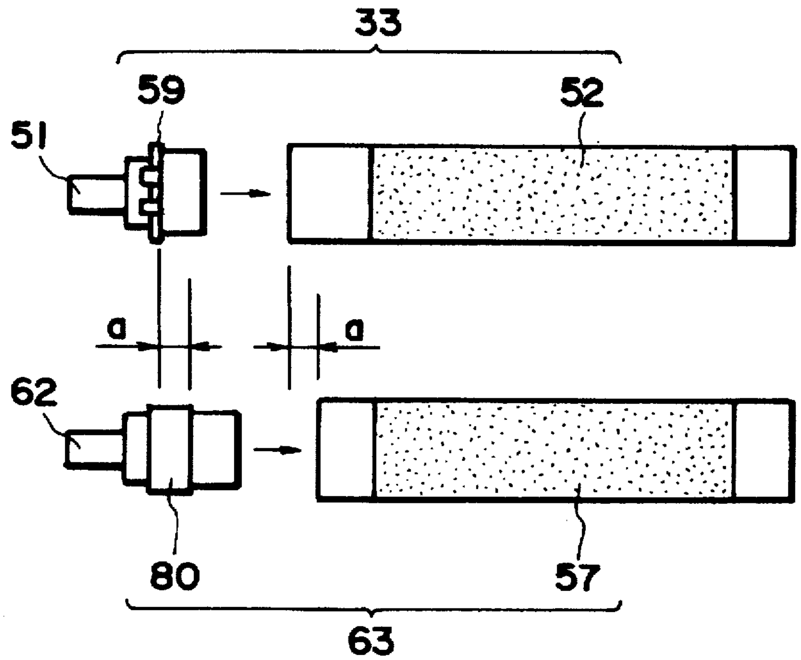
FIG. 14 is an explanatory drawing depicting another method for reconstructing the development roller according to the present invention.

As for the reconditioning of the metallic roller 52, first, the toner adhering to the portions of the metallic roller surface which are not covered with the carbon coat, is wiped off with non-woven fabric soaked with isopropylalcohol (IPA). Then, crimped claws 53, which hold together the flange 51 and metallic roller 52, are shaved away together with a portion of the flange 51, by moving the bit 54 of a tool room lathe in the direction of a block arrow in FIG. 11, so that the flange 51 can be removed. After the flange 51 is removed, the longitudinal ends of the metallic roller 52 are shaved. A length a (distance from the longitudinal end of the metallic roller 52) by which the metallic roller 52 is rotatively shaved away is determined according to the length of the plastic deformation which had occurred at the longitudinal end portions of the metallic roller 52.

Next, the metallic roller surface portions, which are not covered with the carbon coat, are masked with masking member 55, and then, the metallic roller 57 is set in a blasting apparatus. In the blasting apparatus, the metallic roller 57, having been separated from the flange, is turned while being blasted with abrasive, whereby the carbon coat layer is blasted away to give the metallic roller surface a predetermined degree of roughness. The blasting conditions, such as the abrasive diameter, the pressure, the duration, and the like, can be simply set through experimentation. Thereafter, the blasted metallic roller is put through the same steps as those for producing a new development roller. In other words, the contamination and cutting oil adhering to the blasted metallic roller are washed away; a fresh carbon coat is placed on the predetermined surface areas of the metallic roller; and a new plastic flange 58, the collar portion of which is longer by the length a than the original flange, is pressed into the shaved longitudinal end of the metallic roller, and is fixed there by crimping. The width, length, and number/locations, of the claws to be crimped are determined (for example, 3 mm wide, 1 mm long, and four locations 90° apart from adjacent locations) to satisfy the following conditions: the specifications of the claws to be crimped are such that the plastic deformation, which develops on the surface of the metallic roller 57 due to the pressing-in of the flange, and also due to the crimping of the claws, will be prevented from extending to the region in which a predetermined gap is maintained between the reconditioned development roller 61 and photosensitive drum 41 by the spacer ring, which is on the reconditioned development roller 61 and is in contact with the photosensitive member 41; and the strength by which the flange 58 and metallic roller 57 are held together is sufficient (for example, no less than 10 kgfcm) to withstand the driving torque of the reconditioned development roller 61. Next, a magnet roller 33*a* is assembled into the reconditioned development roller 61, and the flange 50 with the electrode is pressed into the reconditioned development roller 58, at the end opposite to the flange 58.

The remaining steps are the same as those in which a new development roller 33 is used. In other words, the same components, and the same steps, though in the reverse order, as those for assembling a process cartridge C using a new development roller 33, are used to finish a reconditioned development unit 3. Then, the top frame 1, the primary charger unit 2, and the cleaning unit 4 are assembled to complete a reconditioned process cartridge C.

Those components, except for the flange 58, to be used for reconditioning do not need to be new as long as they can pass the inspection for reuse; the flange 58 to be used for reconditioning the used development roller (to yield a reconditioned development roller 61) must be a new one designed specifically for the reconditioned metallic roller 57.

The steps described above enable even the metallic rollers of those development rollers, which were formerly judged unsuitable for reuse due to the damages to the carbon coat surface or the like, to be reused, increasing the recycling ratio.

Embodiment 2

The reconditioning steps of this embodiment are basically the same as those of the first embodiment, except for the replacement flange and the method for attaching it. The replacement flange 62 in this embodiment is formed of metallic material with substantially the same coefficient of linear expansion as the metallic roller, and the length of its collar portion is the same as the length a by which the used metallic roller is shaved. This metallic flange 62 is inserted, using cold pressing, into the metallic roller 57, which has been properly shaved and given a carbon coating. This cold pressing alone can give the joint between the flange 62 and metallic roller 57 sufficient strength to withstand the driving force. Naturally, the pressing causes the plastic deformation of the metallic roller, but the location of the plastic deformation is farther away from the region in which a predetermined distance is to be maintained between the reconditioned development roller 63 and photosensitive drum 41 by the spacer ring, compared to the embodiment 1 in which the flange 58 is joined by crimping. As a result, this embodiment can allow more latitude in design.

The remaining steps are the same as those for the first embodiment. Thus, the metallic roller of the used development roller 33, which was formerly rejected during the inspection for reuse, is enabled to be reused as the reconditioned metallic roller 57.

Embodiment 3

A separate step, in which the surface of the used development roller is reconditioned to the level of a new one, will be described.

Figure 15:
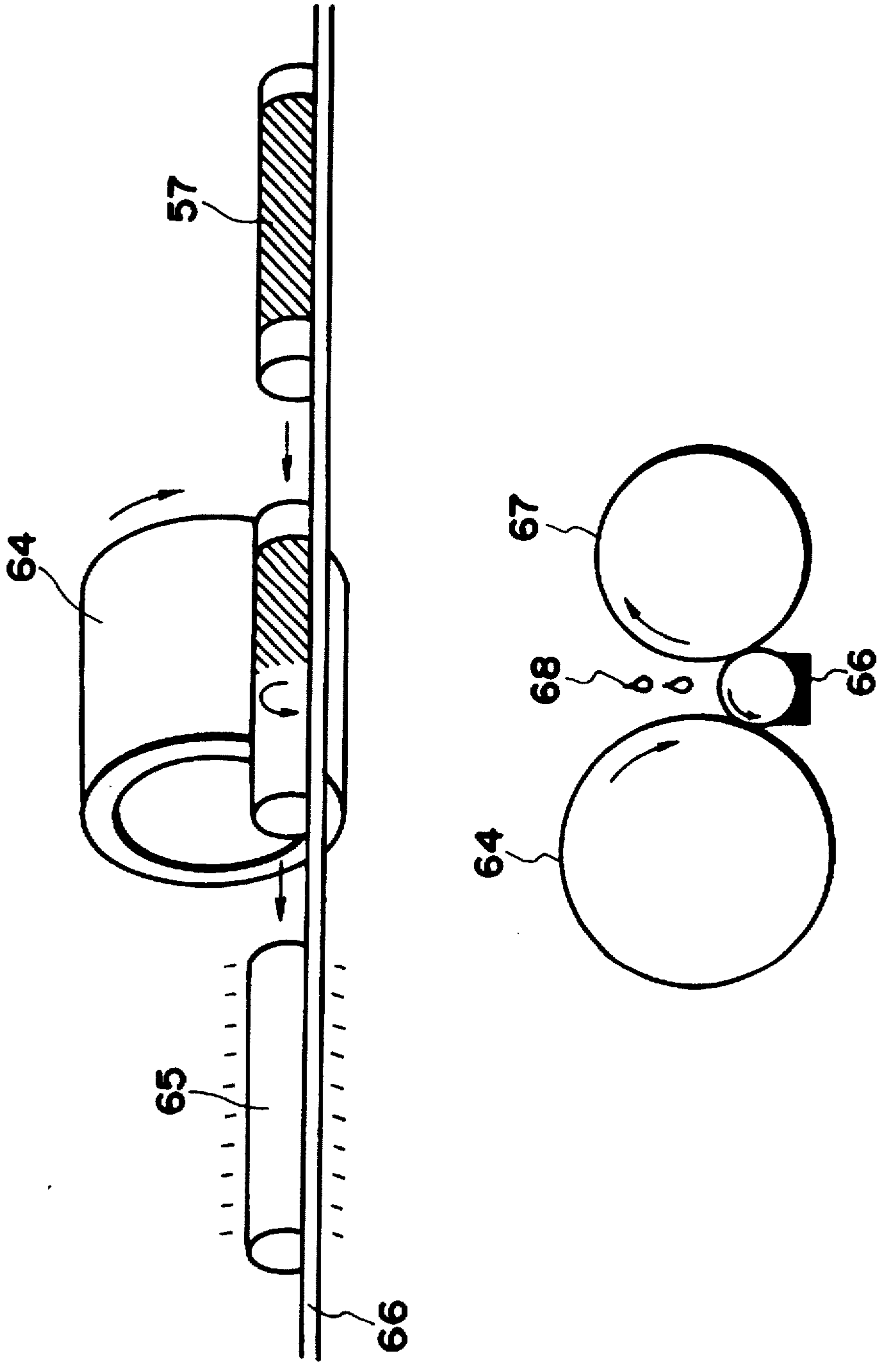
FIG. 15 is an explanatory drawing depicting a method for polishing the metallic roller.

After the crimped claws 53 are shaved away in the same manner as the embodiment 1, a new flange 62, which is formed of metallic material with substantially the same coefficient of linear expansion as that in the second embodiment, is inserted by cold-pressing. Then, the metallic roller joined with the new flange 62 is put through a centerless cylindrical grinding machine, as illustrated in FIG. 15, to polish off the metallic roller surface by a predetermined depth, so that the carbon coat layer, the toner fused to the surface, and the bulging portion created by the cold-pressing, are polished away. The polishing margin is controlled so that the reconditioned process cartridge does not affect the images.

The remaining steps for reassembling the development unit 3 are the same as those for a development unit 3 comprising new components, except for the step in which the flange 62 is joined, and then, the reconditioned development unit 3 is used to re-assemble a process cartridge C. The step for attaching the flange by pressing may be placed after the step for carbon-coating, as long as the metallic roller bulge caused by the pressing-in of the flange does not extend to the contact point of the spacer ring, and also, the joint between the flange and the metallic roller is strong enough to withstand the driving force as described in the preceding embodiments.

It should be noted here that even in the case of the first embodiment, in which the plastic flange 58 is used, the step for joining the plastic flange 58 by crimping may be placed after the step for carbon-coating, as long as the plastic deformation does not extend to the aforementioned spacer ring contact point.

In this embodiment, the surface of the metallic roller 57 is reconditioned to the level of a new metallic roller; therefore, the length a, by which the metallic roller 52 is shaved away, may be compensated by increasing the length of the other flange joined on the opposite end of the metallic roller 57, that is, by using an unillustrated new opposite flange, the length of which is longer by a length a than the original opposite flange. In other words, the length of the new flange joined on the shaved side of the metallic roller may be the same as the original.

Through the steps described above, even the used development rollers, which were formerly impossible to recondition by the steps described in the first or second embodiments, that is, those used development rollers comprising the metallic roller 52, the carbon-coated surface of which could not be reconditioned by blasting, the metallic roller 52, the carbon-coat-less surface of which could not be cleaned by IPA, or the metallic roller 52 with damages irreparable by the conventional method, are enabled to be reconditioned by this embodiment.

Embodiment 4

Figure 17:
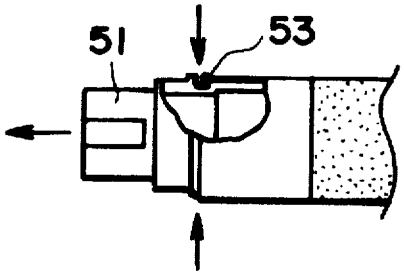
FIG. 17 is an explanatory drawing depicting another method for disassembling the development roller according to the present invention.
Figure 17:
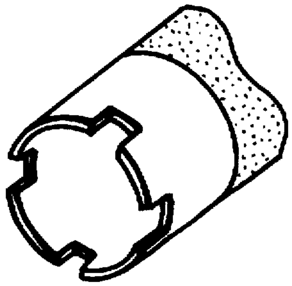
Figure 18:
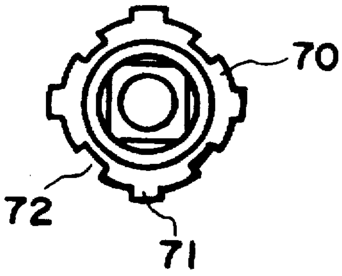
FIG. 18 is a front view of the flange in accordance with the present invention.

The other methods for removing the claws 53 crimped on the plastic flange 51 are as follows. Referring to FIG. 17, the used development roller is firmly positioned on a jig, which fits within the four notches (H-shaped) of the flange 51, and the four crimped claws 53 disposed 90° apart from the adjacent ones are cut off with a hand press, an air press, or the like, the cutting edges of which are located to correspond with the locations of the crimped claws 53. After the removal of the crimped portions of the claws 53, the flange can be easily pulled out in the direction indicated by the black arrow in FIG. 17.

Figure 16:
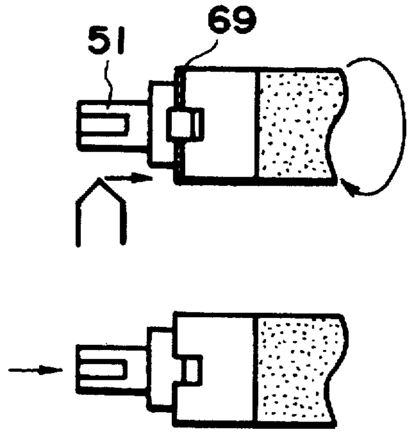
FIG. 16 is an explanatory drawing depicting a method for disassembling the development roller according to the present invention.

The flange 51 may be removed using the difference in coefficient of linear expansion between the flange and metallic roller. In this case, the collar portion 69 of the flange 51, which prevents the flange 51 from moving in its axial direction, is shaved by a lathe as shown in FIG. 16, and then, the development roller is placed in a cold environment (no more than −20° C.), so that the pressed-in flange 51 shrinks to loosen itself from the internal surface of the metallic roller, and therefore, can be pulled out from the opposite end of the metallic roller, by being pushed in the direction of the black arrow mark.

After the old flange is removed, a new flange, which has positioning portions 71 (or recesses when the claws are left intact), can be fixed to the metallic roller.

The metallic roller separated from the old flange in the manner described above is subjected to the same blasting as those used in the preceding embodiments to remove the carbon coat, and then, is coated with a fresh carbon coat. Thereafter, the reconditioned metallic roller is joined with a new flange with the new positioning portions, using the four notches (H-cut portions), with the crimping locations being displaced by 45° from those for the old flange. As a result, the new flange can be joined with the reconditioned metallic roller by crimping the reconditioned metallic roller, using the same crimping conditions as those for the new metallic roller. Therefore, it is unnecessary to establish new crimping conditions.

As for the carbon coat layer, it is not mandatory to blast off the old carbon coat layer; a new carbon coat layer may be laminated on the old carbon coat layer. In this case, the thickness of the carbon coat layer increases; therefore, the thickness of the spacer ring is increased so that the distance between the photosensitive drum and reconditioned development roller remains the same as the predetermined distance between the photosensitive drum and the new development roller.

As described above, according to the present invention, the used development roller can be reconditioned to give it the same quality as the new one, so that the image density does not deteriorate.

While the invention has been described with reference to the structures disclosed herein, it is not confined to the details set forth and this application is intended to cover such modifications or changes as may come within the purposes of the improvements or the scope of the following claims.

What is claimed is:

1. A method for reconditioning a development roller including a roller portion for conveying developer, and a flange portion connected to one end of said roller portion to transmit a driving force, said method comprising the steps of:

separating said flange portion and said roller portion;

removing a part of said roller portion, which is deformed, to shorten said roller portion; and joining an additional flange portion, which is longer in the axial direction of said roller portion than said separated flange portion, with said separated and shortened roller portion.

2. A method according to claim 1, wherein said roller portion comprises a surface layer of resin, and after separating said roller portion from said flange portion, said method further comprising the steps of:

coating the surface of said roller portion with a layer of resin; and then rejoining said additional flange portion with said roller portion.

3. A method according to claim 1, further comprising a step of removing a residual amount of said surface layer of resin of said roller portion before coating said roller portion with the layer of resin.

4. A method according to claim 3, wherein said step of removing a residual amount of said surface layer of resin comprises a step of impacting the surface layer of resin with fine particles.

5. A method according to claim 3, wherein said step of removing surface layer of resin comprises a step of abrading a surface of said roller portion.

6. A method according to claims 1, 2, or 3, wherein prior to reconditioning said separated and shortened roller portion and separated flange portion are joined by crimping or pressing.

7. A method according to claims 1, 2, 3, 4, or 5, wherein a coefficient of linear expansion of a material used for said flange portion roller is substantially equal to that of a material used for the roller portion.

8. A method according to claim 2, comprising the step of removing a residual amount of said surface layer of resin of said roller portion before coating said roller portion with the surface layer of resin.

9. A method according to claim 8, wherein said step of removing surface resin layer of resin comprises a step of impacting the surface layer of resin with fine particles.

10. A method according to claim 8, prior to reconditioning said separated and shortened roller portion and said separated flange portion are joined by crimping or pressing.

11. A method according to claim 8, wherein a coefficient of linear expansion of a material used for said flange portion is substantially equal to that of a material used for said roller portion.

12. A method according to claims 1, 8, or 9, wherein a coefficient of linear expansion of a material used for said flange portion is substantially equal to that of a material used for said roller portion.

* * * * *

UNITED STATES PATENT AND TRADEMARK OFFICE

CERTIFICATE OF CORRECTION

PATENT NO. : 5,765,286

DATED : June 16, 1998

INVENTOR(S) : MINORU SATO ET AL.

It is certified that error appears in the above-identified patent and that said Letters Patent is hereby corrected as shown below:

COLUMN 10:

Line 53 "resin" (first occurrence) should be deleted.
Line 55 "claim 8" should read --claim 8, wherein--.

Signed and Sealed this

Twelfth Day of January, 1999

Attest:

Attesting Officer

*Acting Commissioner of Patents and Trademarks*